(No Model.)

W. H. WHITTAKER.
BAND TIGHTENER.

No. 338,811. Patented Mar. 30, 1886.

Witnesses

Inventor
William H. Whittaker.

By his Attorney Chas. H. Fowler

UNITED STATES PATENT OFFICE.

WILLIAM H. WHITTAKER, OF SENECA, ILLINOIS.

BAND-TIGHTENER.

SPECIFICATION forming part of Letters Patent No. 338,811, dated March 30, 1886.

Application filed December 12, 1885. Serial No. 185,440. (No model.)

*To all whom it may concern:*

Be it known that I, WILLIAM H. WHITTAKER, a citizen of the United States, residing at Seneca, in the county of La Salle and State of Illinois, have invented certain new and useful Improvements in Band-Tighteners; and I do hereby declare that the following is a full, clear, and exact description of the same, reference being had to the annexed drawings, making a part of this specification, and to the letters and figures of reference marked thereon.

Figure 1:
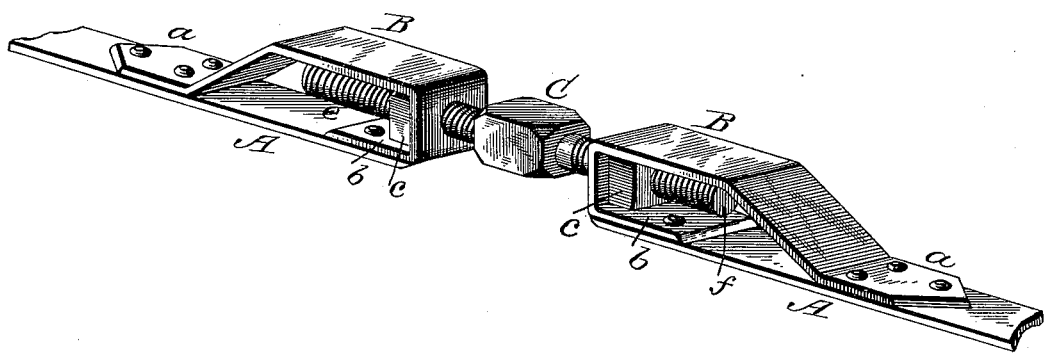
Figure 2:
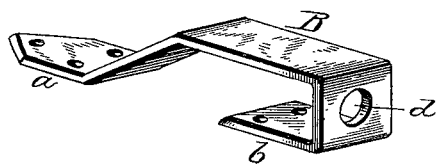
Figure 3:
Figure 4:
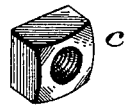

Figure 1 of the drawings is a perspective view of my tightening device, showing it applied to the ends of a metal band or hoop; Fig. 2, a similar view of one of the brackets; Fig. 3, a detail view of the tightening screw-rod, and Fig. 4 a detail view of one of the nuts.

The present invention has for its object to provide a simple and effective attachment for metal bands or hoops, said attachment constituting means for drawing the ends of such bands together to tighten them around bales of cotton, hay, or other goods.

A right-and-left-hand screw with appropriate nuts has been before suggested in connection with a band having its ends bent upon itself at sharp angles to form loops; but in such construction the band is greatly weakened and is liable to break just where the greatest strength is required.

I make my attachment complete in itself, and attach it to the ends of a hoop without bending the hoop. It may be readily applied to any hoops now in use, and it may be used again and again with different hoops.

In the accompanying drawings, A represents the ends of a metal hoop or band, to which are riveted or otherwise attached brackets B. These brackets are formed with extension-plates $a\ b$, through which the rivets pass for attaching the brackets to the ends of the hoop or band. The fastening or extension plates $b$ form a support for nut $c$, and also strengthen the ends of the band or hoop. The inner ends of the brackets B have holes through which extend rods $e\ f$, formed with screw-threads in opposite directions. The rods project from a flat-sided head, C, to receive a suitable wrench or other tool for turning it, and when thus turned by means of the nuts $c$ the two ends of the loop or band are brought together and the hoop or band tightened, the nuts being held stationary and from moving on the rods by the brackets.

It should be understood that the brackets B and nuts $c$ are entirely independent of each other, there being no screw-threads in the hole $d$, the ends of the rods $e\ f$ loosely passing through the same and only engaging with the threads of the nuts. This will admit of longer use of the brackets, as there are no screw-threads to wear or get out of order, while if the threads of the nuts become worn they can be readily substituted or replaced by others, thereby enabling the band with its brackets to be used a great length of time.

Having now fully described my invention, what I claim as new, and desire to secure by Letters Patent, is—

1. The brackets B, having securing-plates $b\ a$ and holes $d$, combined with the nuts $c$, and with the rods having right and left threads, the whole being adapted to serve with a metal band, A, as set forth.

2. The combination, with a metal band or tie, A, and with a tightening-rod having right and left hand threads, of nuts $c$, and brackets, as B, arranged to confine said nuts and to be removably secured to metal bands of different lengths and widths, as set forth.

In testimony that I claim the above I have hereunto subscribed my name in the presence of two witnesses.

WILLIAM H. WHITTAKER.

Witnesses:
J. W. ELLIS,
J. S. EVERHART.